Figure 11:
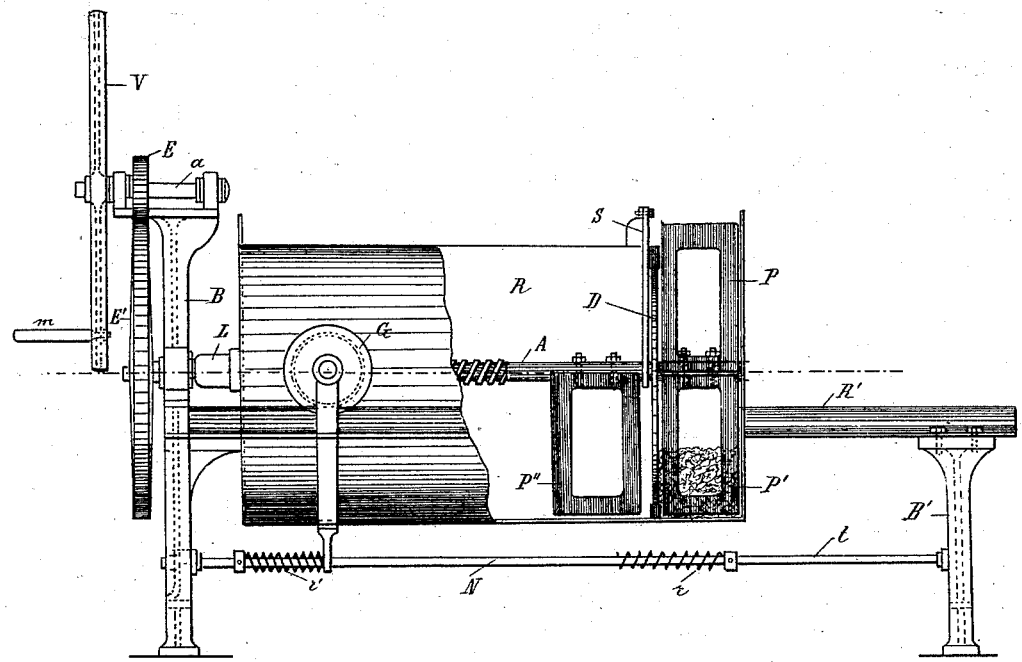

(No Model.) 3 Sheets—Sheet 1.
E. VIOLLET.
KNEADING MACHINE.
No. 448,826. Patented Mar. 24, 1891.
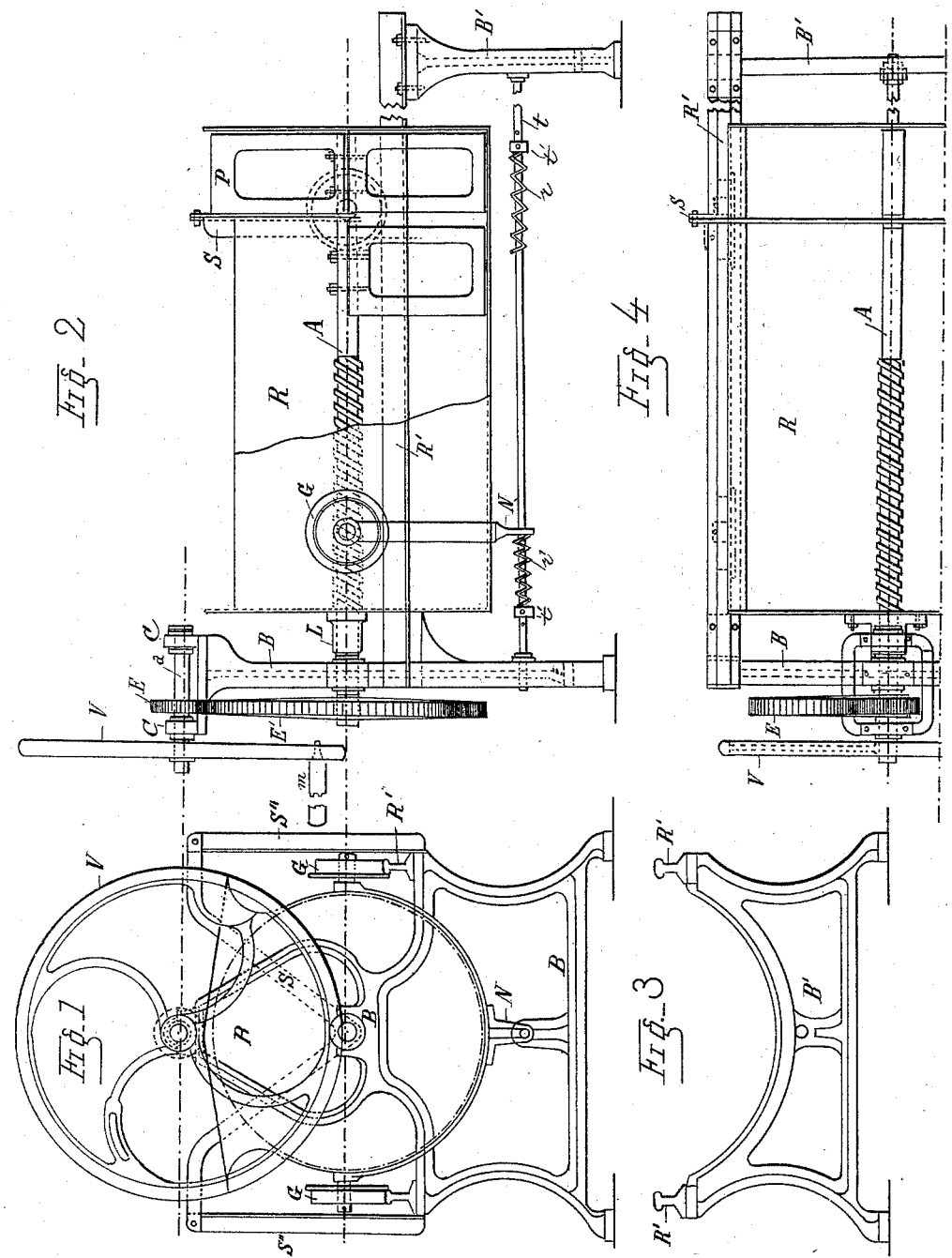

(No Model.) 3 Sheets—Sheet 2.
E. VIOLLET.
KNEADING MACHINE.
No. 448,826. Patented Mar. 24, 1891.
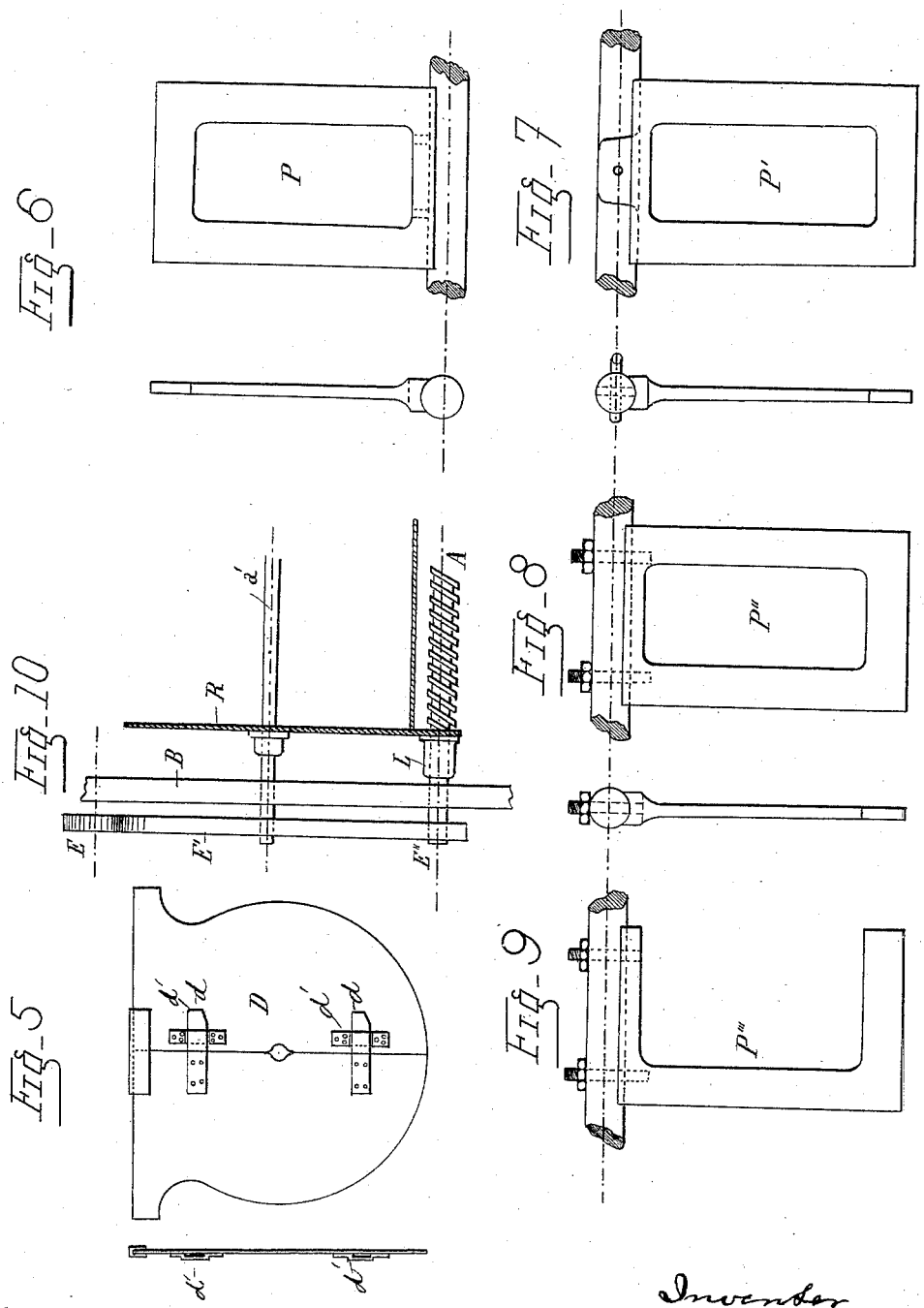
Witnesses.
W Harvey Muzzy
D. N. Naylor
Inventor
Emile Viollet
by
Wm H Babcock
Attorney (No Model.) 3 Sheets—Sheet 3.

E. VIOLLET.
KNEADING MACHINE.

No. 448,826. Patented Mar. 24, 1891.

Witnesses.
W. Harvey Murphy
R. P. Seward

Inventor.
Emile Viollet
By Wm H Babcock
Atty.

UNITED STATES PATENT OFFICE.

EMILE VIOLLET, OF PARIS, FRANCE.

KNEADING-MACHINE.

SPECIFICATION forming part of Letters Patent No. 448,826, dated March 24, 1891.

Application filed September 19, 1890. Serial No. 365,500. (No model.) Patented in France March 3, 1890, No. 204,096.

*To all whom it may concern:*

Be it known that I, EMILE VIOLLET, a citizen of the Republic of France, residing at Paris, France, have invented certain new and useful Improvements in Kneading-Machines, (for which I have obtained the following-mentioned patent: in France, No. 204,096, dated March 3, 1890;) and I do hereby declare the following to be a full, clear, and exact description of the invention, reference being had to the accompanying drawings, and to the letters marked thereon.

In said drawings, Figure 1 represents an end view of a machine embodying my invention. Fig. 2 represents a side elevation of the same, partly broken away. Fig. 3 represents a detail view in elevation of one of the end frames. Fig. 4 represents a plan view of the machine, the kneading-trough being removed. Fig. 5 represents in detail the dough-divider in front and edge elevation. Fig. 6 represents a similar view of one of the kneading-blades. Figs. 7, 8, and 9 represent similar views of other kneading-blades. Fig. 10 represents a modification of a part of my machine, partly in vertical section and partly in side elevation. Fig. 11 represents a side elevation of the kneading-machine embodying my invention, partly broken away to show the divider in position.

A designates a screw-shaft, which turns in bearings supported by end frames B B'.

The frame B is provided at the top with additional bearings C for the short shaft $a$, which has a pinion E and a fly-wheel V mounted thereon. This fly-wheel may be provided with a handle $m$, as shown, and thus becomes a hand driving-wheel, or it may be driven by horse-power or mechanical power in any convenient way. The pinion E meshes with a hand-wheel E' on shaft A, so that the rotation of wheel V turns the said shaft. The kneading-trough R, as shown in Figs. 1 and 2, is longitudinally traversed by this shaft and provided at one end or at each end with an internally-screw-threaded sleeve L, which engages with the screw-thread on said shaft under the conditions hereinafter stated. It is preferable to have such a sleeve at each end; but only one has been shown, the other end of said trough being broken away in Fig. 2 to show certain parts more clearly, while this omitted end could not appear in Fig. 1, and the trough is wanting altogether in Figs. 3 and 4. The trough is not supported by said shaft, but is provided with rollers G, which run on rails R', rigidly attached to and supported by end frames B B'. An arm N, rigid with said trough, extends downward in proximity to a rod $t$, which is attached to the said end frames and parallel with said screw-shaft, but below the latter. This rod has fixed shoulders $t'$ on it near its ends, and springs $r$, surrounding said rod, bear outwardly against them, exerting at the other end their pressure inwardly against said arm when it is brought in contact with them. The screw-thread of said shaft ends a little beyond the middle of the latter, leaving the part of said shaft which is away from gear-wheel E' quite smooth. On this smooth part the kneading-blades P P' P² P³ are mounted, being bolted to said shaft. A rigid supporting-frame S, which may be duplicated, if desired, extends down between two of these kneading-blades in V shape, allowing said shaft to pass through its apex. The vertical side bars S'' of this frame are rigid at their lower ends with the rails R', so that said frame S supports the outer part of shaft A. The dough-divider or partition D is placed between these kneading-blades to confine the dough to the space operated on by the outer blade only in case no more than a small quantity of dough is to be kneaded. This divider or partition is preferably made in two pieces detachably connected by small bars $d$ of one piece or section fitting into staples $d'$ of the other section, as shown.

The divider D, as shown in Fig. 11, is placed between the support S of the shaft and the kneading-blades P P'. It serves to lessen the size of the available part of the kneading-trough in order to make a smaller quantity of pastry. In this case it is necessary to turn the fly-wheel always in the same direction in order that the kneading-trough shall remain in place—that is to say, so that the screw will not engage with the screw-thread, which would cause the kneading-trough to travel and pack the pastry together and cause the kneaders to turn in vacancy. The divider can be made equally serviceable in the position of the kneading-trough indicated by Fig. 11 when this has ended its course to the right. To put the divider in position for operation one half or section of it is first adjusted in the trough and the second half or section is then placed thereon, and it is then fixed by means of a little catch and plate on the upper half.

In the modification shown in Fig. 7 the blade is attached to the shaft by means of a sleeve fast on said blade and extending partially around and bolted to said shaft. In Fig. 9 a modified form of the blade is shown.

In the modification shown in Fig. 10 the trough is supported on a smooth shaft $a'$ and provided with a downward extension, to which the internally-screw-threaded sleeve L is attached, the screw-threaded shaft A, which engages with said sleeve, being arranged under the said trough. The kneading-blades are not shown, but must be mounted on shaft $a'$.

The operation of the machine, as illustrated by Figs. 1 to 9, inclusive, is as follows: The trough being at the end of the screw-threads and the shaft A being turned in one direction, the kneading-blades are whirled around, kneading the dough in the trough, which remains stationary. The rotation of shaft A in the opposite direction causes, by the engagement of its screw-threads with those in sleeve or sleeves L, the longitudinal movement of the trough on its tracks, the spring $r$ or $r'$, whichever may be in contact with arm N, serving to hold said screw-threads of sleeve and shaft together for engagement at the beginning of such motion. This travel of the trough of course brings a different part of it and of the dough contained in it within the kneading action of the blades P P' P² P³. The travel of the trough in the opposite direction is caused by a reversal of motion, the engagement and operation being the same.

The operation of the modification shown in Fig. 10 is essentially identical with that above described.

Having thus described my invention, what I claim as new, and desire to secure by Letters Patent, is—

1. In combination with a screw-threaded shaft and gearing for driving the same, a trough provided with an internally-screw-threaded sleeve which engages the thread on said shaft, rollers attached to said trough, rails on which said rollers run, and kneading-blades turning within said trough, substantially as set forth.

2. In combination with a longitudinally-traveling trough having rollers, a rigid arm, and a screw-threaded sleeve, a track on which said rollers run, a screw-threaded shaft and its driving-gear, kneading-blades mounted on and turning with said shaft, and springs bearing, as explained, against said arm to force the said sleeve into engagement with the thread on said shaft, the latter passing through said sleeve and having smooth parts near each end, for the purpose set forth.

3. In combination with a screw-threaded shaft smooth near its ends and carrying kneading-blades, a trough provided with rollers and a screw-threaded sleeve receiving said shaft, a track on which said rollers run, and a divider or partition D, which may be inserted between the kneading-blades, the trough being moved longitudinally or left stationary, at will, as set forth.

In testimony that I claim the foregoing I have hereunto set my hand this 29th day of August, 1890.

EMILE VIOLLET.

Witnesses:
J. L. RATHBONE,
EMILE KANTER.